(12) United States Patent
Higashi et al.

(10) Patent No.: US 10,634,535 B2
(45) Date of Patent: Apr. 28, 2020

(54) AIRFLOW SENSOR WITH GAS COMPOSITION CORRECTION

(71) Applicant: Honeywell International Inc., Morris Plains, NJ (US)

(72) Inventors: Robert Higashi, Morristown, NJ (US); Wei Yang, Morristown, NJ (US)

(73) Assignee: Honeywell International Inc., Morris Plains, NJ (US)

( * ) Notice: Subject to any disclaimer, the term of this patent is extended or adjusted under 35 U.S.C. 154(b) by 201 days.

(21) Appl. No.: 15/920,205

(22) Filed: Mar. 13, 2018

(65) Prior Publication Data

US 2019/0285453 A1     Sep. 19, 2019

(51) Int. Cl.
| | |
|---|---|
| *G01F 1/69* | (2006.01) |
| *G01F 1/696* | (2006.01) |
| *G01F 1/684* | (2006.01) |
| *G01F 1/692* | (2006.01) |
| *G01F 15/04* | (2006.01) |

(52) U.S. Cl.
CPC .............. *G01F 1/69* (2013.01); *G01F 1/6842* (2013.01); *G01F 1/6845* (2013.01); *G01F 1/692* (2013.01); *G01F 1/6965* (2013.01); *G01F 15/043* (2013.01)

(58) Field of Classification Search
CPC ........ G01F 1/684; G01F 1/6845; G01F 1/688; G01F 1/6888; G01F 1/69; G01F 1/696; G01F 1/698; G01F 1/699; G01F 15/02; G01F 15/022; G01F 15/043

USPC .............. 73/204.17, 204.18, 204.19, 204.23, 73/204.25, 861.01, 861.02

See application file for complete search history.

(56) References Cited

U.S. PATENT DOCUMENTS

| | | | |
|---|---|---|---|
| 6,513,393 B1 | 2/2003 | Eckert et al. | |
| 10,345,130 B2 * | 7/2019 | Bentley | ...................... G01F 1/69 |
| 2011/0296910 A1 * | 12/2011 | Lopez | ................... G01F 1/6842 |
| | | | 73/204.27 |

FOREIGN PATENT DOCUMENTS

JP    4466232 B2    5/2010

* cited by examiner

*Primary Examiner* — Benjamin R Schmitt
(74) *Attorney, Agent, or Firm* — Wick Phillips Gould & Martin, LLP

(57) ABSTRACT

A sensor for sensing a flow rate of a fluid comprises an upstream resistive element having a first resistance that changes with temperature, a downstream resistive element having a second resistance that changes with temperature, at least one tail resistor configured to determine thermal conductivity of the fluid, at least one pressure sensor configured to determine a differential pressure in the flow direction of the fluid, and circuitry configured to use the differential pressure with the thermal conductivity to determine a kinematic viscosity of the fluid, and compensate an output of the bridge circuit. The downstream resistive element is situated downstream of the upstream resistive element in the flow direction of the fluid, and the upstream resistive element and the downstream resistive element are operatively connected in a bridge circuit.

20 Claims, 4 Drawing Sheets

AIRFLOW SENSOR WITH GAS COMPOSITION CORRECTION

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Fluid flow transducers are widely used to measure the flow of fluid materials. Flow sensors are used to sense fluid flow, and in some cases, provide flow signals that can be used for instrumentation and/or control. Flow sensors are used in a wide variety of applications including industrial applications, medical applications, engine control applications, military applications, and aeronautical applications, to name just a few. Gas flow transducers are used throughout the microelectronics industry, for example. The measurement and control of gas flows must be very precise in this industry. The vacuum technology used in the microelectronics industry requires small but precise gas flows. These small flows permit a flow meter to be located inside a gas delivery tube. Other industries require large gas consumptions. In such industries, a small fraction of the delivered gas may be routed through a bypass tube. The gas flow is often measured in this bypass tube, and the measured flow is then multiplied by the ratio of total gas flow to the gas flowing in the bypass tube. Fluid flow transducers are also used to measure the flow of liquid commodities. For example, chemical companies use fluid flow transducers to measure the flow of liquid reactants used in a chemical reaction. The precise measure of the flows of multiple reactants may be important for maintaining a proper stoichiometric ratio for a reaction.

SUMMARY

In an embodiment, a sensor for sensing a flow rate of a fluid comprises an upstream resistive element having a first resistance that changes with temperature, a downstream resistive element having a second resistance that changes with temperature, at least one tail resistor configured to determine thermal conductivity of the fluid, at least one pressure sensor configured to determine a differential pressure in the flow direction of the fluid, and circuitry configured to use the differential pressure with the thermal conductivity to determine a kinematic viscosity of the fluid, and compensate an output of the bridge circuit. The downstream resistive element is situated downstream of the upstream resistive element in the flow direction of the fluid, and the upstream resistive element and the downstream resistive element are operatively connected in a bridge circuit. The at least one tail resistor is stable with temperature, and the at least one tail resistor is electrically coupled to at least one of the upstream resistive element or the downstream resistive element.

In an embodiment, a method for determining fluid flow comprises: supplying power to a bridge circuit in a flow sensor, passing the fluid over the bridge circuit via the flow channel, measuring the voltage change at the tail resistor, determining the thermal conductivity of the fluid based on the measured voltage change, determining a differential pressure between an inlet of the flow channel and an outlet of the flow channel, and determining the kinematic viscosity of the fluid using the thermal conductivity and the differential pressure. The bridge circuit comprises an upstream resistive element, a downstream resistive element, and at least one tail resistor electrically coupled to at least one of the upstream resistive element or the downstream resistive element. The flow sensor comprises at least one pressure sensor disposed in a flow channel of the flow sensor.

In an embodiment, a flow sensor for sensing a fluid flow rate through a flow channel comprises a heating element configured to be substantially in direct thermal coupling with fluid flowing through the flow channel, an upstream resistive element having a first resistance that changes with temperature, a downstream resistive element having a second resistance that changes with temperature, at least one tail resistor configured to indicate thermal conductivity of the fluid flowing through the flow channel, and a pressure sensor configured to determine a differential pressure in the flow direction of the fluid flowing through the flow channel. The downstream resistive element is situated downstream of the upstream resistive element in the flow channel. The differential pressure is used with the thermal conductivity to determine a kinematic viscosity of the fluid flowing through the flow channel, and the upstream resistive element and the downstream resistive element are operatively connected in a bridge circuit. The at least one tail resistor is stable with temperature, and the at least one tail resistor is electrically coupled to at least one of the upstream resistive element, the downstream resistive element, or the heating element.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
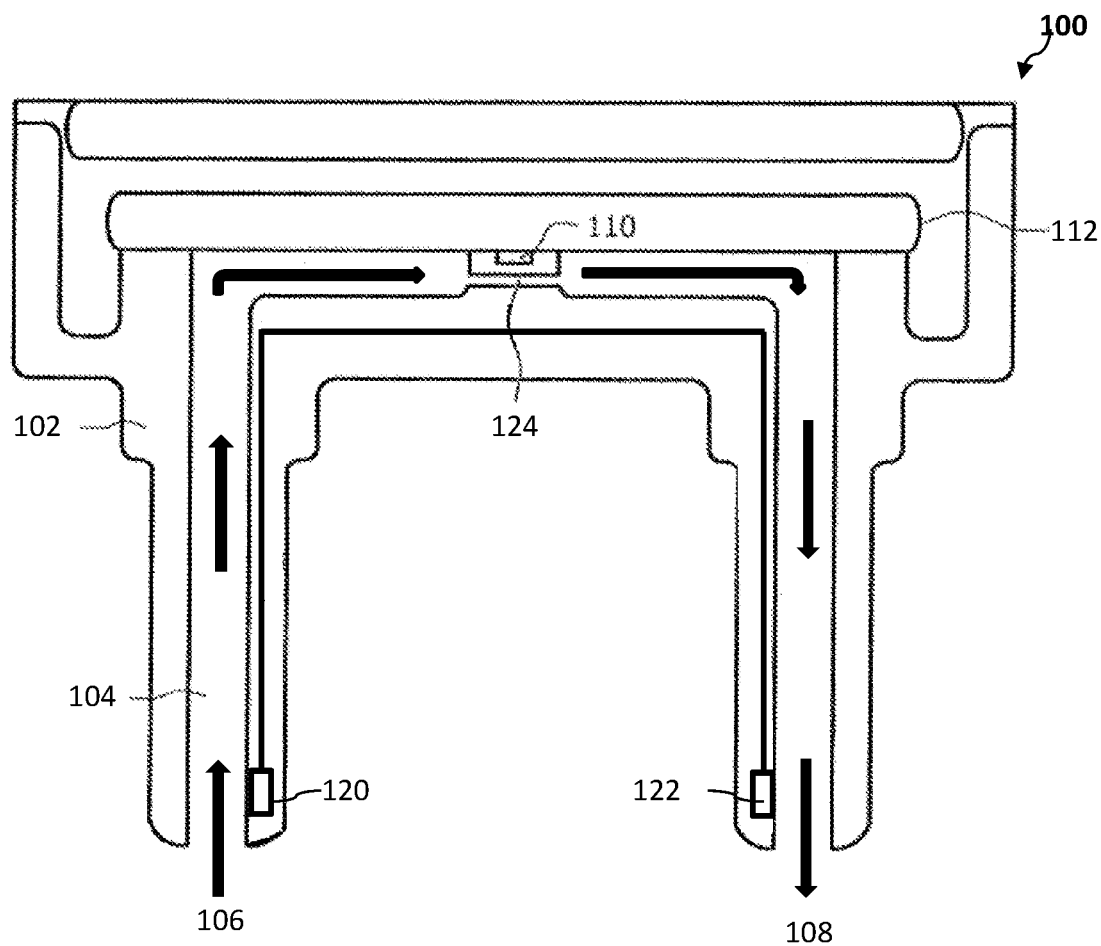
FIG. 1 illustrates a schematic cross-sectional view of an example flow sensing device.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The following brief definition of terms shall apply throughout the application:

The term "comprising" means including but not limited to, and should be interpreted in the manner it is typically used in the patent context;

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example;

The terms "about" or "approximately" or the like, when used with a number, may mean that specific number, or alternatively, a range in proximity to the specific number, as understood by persons of skill in the art field; and If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

Embodiments of the disclosure include methods and systems for determining a flow rate of a fluid through a flow sensor. In order to provide improved accuracy, the flow rate can be compensated using one or more thermal properties of the fluid. Conventional thermal based MEMS flow sensors may measure the mass flow of a known gas or known mixture of gases. If the gas composition varies, or is unknown, it may not be possible to determine the actual flow of the gas without additional information. However, if the thermal conductivity and diffusivity of a gas are known, it may be possible to correct the mass flow values, even if the identity of the gas is unknown.

Thermal diffusivity may be difficult to measure because it depends on the thermal "mass" of the gas, and gas density is low compared to a solid and is therefore small compared to any structure which might be used to measure the gas density. While the thermal diffusivity is difficult to measure, it may still be possible to use the thermal characteristics of the gas by determining a characteristic of the gas other than the thermal diffusivity. For example, the Prandtl number is the ratio of thermal diffusivity to momentum diffusivity and the Prandtl number is typically between 0.63 to 0.8 for many gases (except hydrogen and some noble gases which can be between 0.16-0.7). If the gases of interest (e.g., the gasses within the fluid flowing through the sensor) have comparable Prandtl numbers, then measuring kinematic viscosity can be used to determine or provide an indication of the thermal diffusivity. Kinematic viscosity can be easier to measure than thermal diffusivity, as it is related to the pressure drop of the gas flowing through a straight pipe with laminar flow.

Embodiments of the disclosure include a cost-effective, small and low power thermal conductivity and kinematic viscosity sensor to allow for correction of conventional fluid flow sensors, where the sensor may be integrated into a conventional fluid flow sensor or may be used concurrently with a conventional fluid flow sensor.

Embodiments of the disclosure may include adding additional circuitry to a central-heater fluid flow sensor to gather additional information about the gas surrounding the sensor. When the heater circuit is powered by a constant direct current (DC) voltage and the current required to maintain this voltage may be measured, the power dissipation of the heater may be determined. As the flow sense element has been designed to minimize heat dissipation in the element itself, this power dissipation correlates well to the thermal conductivity of the gas surrounding the heater (wherein the thermal conductivity is a measure of how the gas dissipates the heat away from the heater). Additionally, the additional circuitry may comprise one or more pressure sensor configured to determine the differential pressure between an inlet and an outlet of the sensor. The differential pressure (or pressure drop) may be used to determine the kinematic viscosity of the fluid flowing from the inlet to the outlet. With indications or measurements of both the thermal conductivity and the kinematic viscosity, the flow sensor output can be compensated to indicate standard volumetric flow rates.

For the thermal conductivity, one or more temperature-stable resistors, $R_{tail-1}$ and $R_{tail-2}$ in the below figures, may be connected to a fluid flow sense die to qualify the rate of rise in temperate at the sensing resistors. If the temperature is known, the voltage across $R_{tail-2}$ is directly proportional to the heater power, which, as stated above, allows thermal conductivity to be measured, provided the sense element has been characterized using a known test gas to allow for sensor-to-sensor variation. Having determined the thermal conductivity, kinematic viscosity, and an air equivalent flow signal, the actual standard volumetric flow rate of the gas may be determined based on an air calibration of the sense element. Additionally, use of pressure information and the flow characteristics of the fluid flow sensor can allow the kinematic viscosity to be determined.

FIG. 1 is a schematic cross-sectional view of an example flow sensing device 100. The illustrative flow sensing device 100 includes a flow sensing device body 102 that defines a flow channel 104 having a first end 106 and a second end 108. A fluid may flow through the flow channel 104 from, for example, the first end 106 to the second end 108 and past a flow sensor 110. The flow sensor 110 may sense the flow of the fluid passing over the flow sensor 110 and provide one or more output signals indicative of that flow. In some cases, the flow sensor 110 may provide one or more output signals that identity the flow rate of the fluid passing over the flow sensor 110.

While not required, the flow sensor 110 may include a flow sensor die that is mounted to a substrate 112. The substrate 112 may be mounted in the flow sensing device body 102. In some cases, some of the support circuitry for the flow sensor die may be located on the substrate 112 and/or may be located outside of the flow sensing device 100 altogether (e.g., located in a device that uses the output of the flow sensing device 100). FIG. 1 shows one example configuration of a flow sensing device. It should be recognized that such flow sensor devices can and do assume a wide variety of different configurations, depending on the application.

In some embodiments, the flow sensing device 100 may comprise an inlet pressure sensor 120 configured to measure the pressure at the inlet 106 of the flow channel 104, and an outlet pressure sensor 122 configured to measure the pressure at the outlet 108 of the flow channel 104. While shown at the inlet and outlet of the flow channel, the pressure sensors can alternatively be placed upstream and downstream at any point relative to the flow sensor. The differential pressure between the inlet pressure sensor 120 and outlet pressure sensor 122 may be used to determine the kinematic viscosity of the fluid flowing through the flow channel 104, as described in more detail herein. In some embodiments, the differential pressure between the inlet pressure sensor 120 and outlet pressure sensor 122 may be generated by a restriction 124 in the flow channel 104 that is located near the flow sensor 110.

Figure 2:
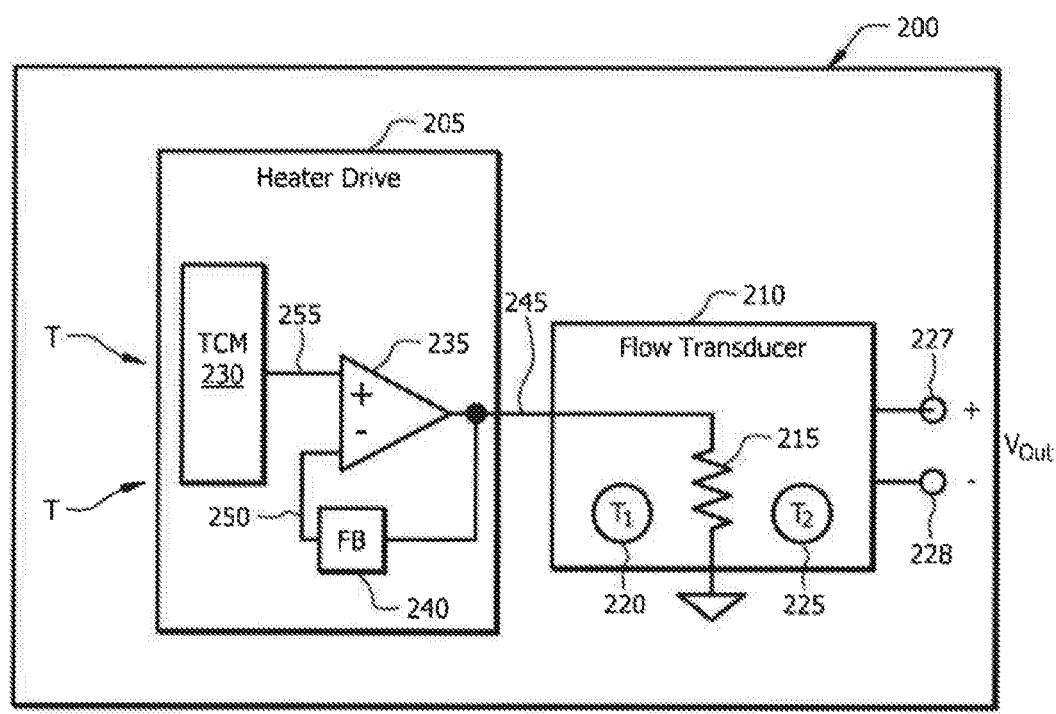
FIG. 2 illustrates a block diagram of an exemplary flow sensing device.

FIG. 2 illustrates a block diagram of an exemplary temperature-compensated fluid flow measurement system 200. The fluid flow measurement system 200 includes a heater drive circuit 205 and a fluid flow transducer 210. The flow transducer 210 has a heater 215 located between a first temperature sensor 220 and a second temperature sensor 225. Power for the heater 215 is supplied by a heater drive circuit 205. When a flow transducer 210 is introduced into a fluid material, such as a gas or liquid material, the heater 215 may be in thermal conduction with the fluid material. In some embodiments, the fluid material may substantially surround the heater 215. In some embodiments, the fluid material may pass directly over the heater 215. When the flow transducer is introduced into a fluid material, the temperature sensors 220, 225 may be in thermal communication with the fluid material. In this way, the temperature sensors 220, 225 may be in convective connection with the heater 215. The measurements of the temperature sensors 220, 225 may be indicative of a flow of the fluid material. The flow transducer 210 may put a signal indicative of a flow of the fluid material on one or more output pins 227, 228.

The heater drive circuit 205 includes a temperature-compensation module 230, an amplifier 235, and a feedback network 240. In some embodiments, the amplifier 235 may have a gain greater than one. In some embodiments, the amplifier's gain may be less than or equal to one. The amplifier 235 has an output node 245, which is connected to the heater 215 of the flow transducer 210. The feedback network 240 samples a signal on the output node 245 and may perform signal processing operations to the signal, such as may be performed by passive impedance networks, in some embodiments. The processed output signal is then delivered to a negative input node 250 of the amplifier 235 in this example. The Temperature-Compensation Module (TCM) 230 may generate a temperature-varying signal and then may deliver this temperature-varying signal to the positive input node 255 of the amplifier 235. The temperature-varying signal may be used to compensate for a disturbance due to the temperature variation of the fluid material. A temperature profile of the temperature-varying signal may be predetermined in some embodiments. In an exemplary embodiment, the temperature profile may be programmable. In various embodiments, the temperature profile may be trimmable, for example.

In an embodiment, a sensor may be used to determine the flow rate of a fluid (e.g., a liquid, a gas, etc.). In some embodiments, the content of the fluid may be unknown, so it may be helpful to determine one or more characteristics or properties of the unknown fluid. In some embodiments, the unknown fluid could be a gas such as air, argon, nitrogen, methane, oxygen, etc. To accurately sense the flow rate of the unknown fluid and/or correct the flow rate to standard conditions, the sensor may be configured to self-calibrate the sensor's readings based on determined thermal properties of the fluid.

Figure 3:
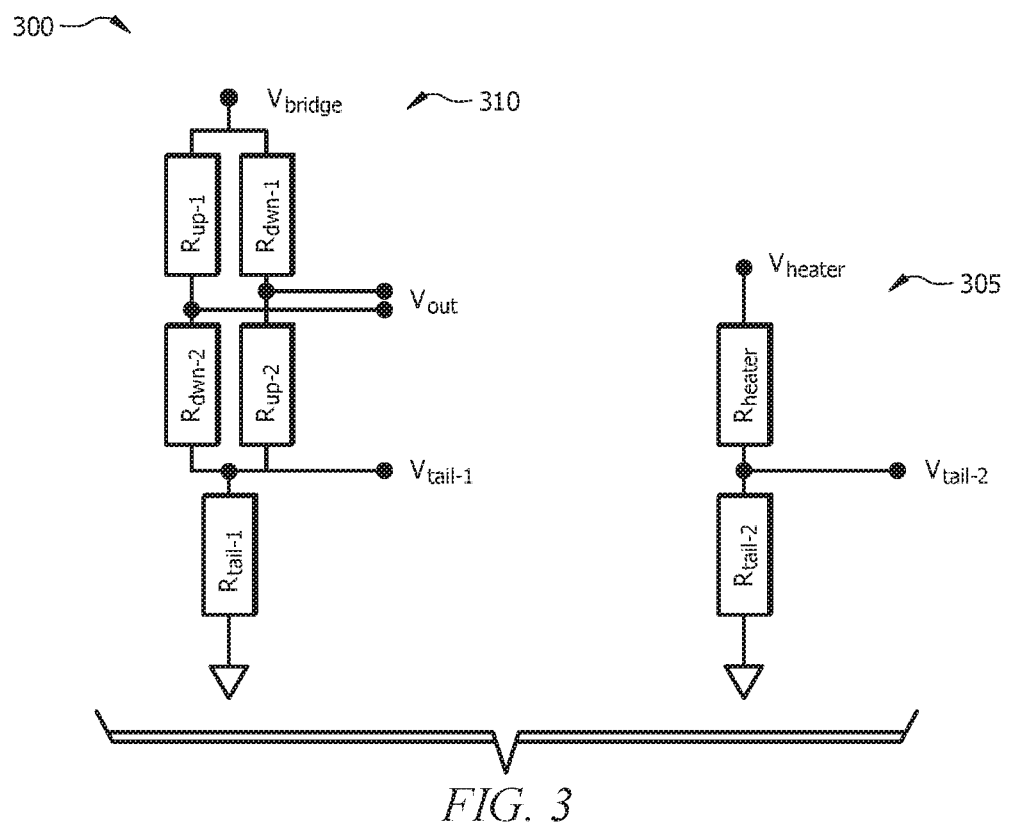
FIG. 3 illustrates a schematic circuit diagram of a flow sensor configured to determine thermal properties of a fluid.

FIG. 3 illustrates a circuit diagram 300 comprising a bridge circuit 310 and a heater circuit 305 that may be incorporated into the sensor. In some embodiments, the circuit 300 may be configured to determine thermal properties of the fluid concurrently with determining the flow rate of the fluid. The bridge circuit 310 may comprise at least one upstream resistive element $R_{up-1}$ and at least one downstream resistive element $R_{dwn-1}$. In some embodiments, the circuit 300 may comprise a second upstream resistive element $R_{up-2}$ and a second downstream resistive element $R_{dwn-2}$. The resistive elements of the bridge circuit 310 may be balanced in their resistance values. In some embodiments, the bridge circuit 310 may also comprise a first tail resistor $R_{tail-1}$, wherein the first tail resistor may be electrically coupled to the upstream and downstream resistive elements.

The heater circuit 305 may comprise a heating element $R_{heater}$ that may be physically located between the upstream and downstream resistive elements of the bridge circuit 310. The heater circuit 305 may also comprise a second tail resistor $R_{tail-2}$ that is electrically coupled to the heating element $R_{heater}$.

The upstream and downstream resistive elements of the bridge circuit 310 may change with temperature. The tail resistors $R_{tail-1}$ and $R_{tail-2}$ may be stable with temperature. The tail resistors may be configured to determine one or more thermal properties of a fluid that is passed over the surface of the circuit 300. For example, the tail resistors can be used to determine the thermal conductivity of the fluid. The circuit 300 may be used to determine the mass flow rate of the fluid, and by determining one or more thermal properties of the fluid, the identity of the fluid may be approximated, and the volumetric flow rate may be calculated. Alternatively, a look-up table may be used where it is not necessary to identify the fluid.

The mass flow rate may be determined by the bridge 310 using one or more of the following equations:

$$\dot{Q} = 0.664 * Pr^{\frac{1}{3}} * \sqrt{Re_L} * \frac{k * A_{hot}}{L} * \Delta T +$$

$$\frac{k * A_{no-flow}}{L_{no-flow}} * \Delta T + \frac{k_{bridge} * A_{bridge}}{L_{bridge}} * \Delta T$$

$$\dot{Q} = 0.664 * \left(\frac{C_p * \mu}{k}\right)^{\frac{1}{3}} * \sqrt{\frac{\rho * u_\infty * L}{\mu}} * \frac{k * A_{hot}}{L} * \Delta T +$$

$$\frac{k * A_{no-flow}}{L_{no-flow}} * \Delta T + \frac{k_{bridge} * A_{bridge}}{L_{bridge}} * \Delta T$$

$$\dot{Q} \propto C_P^{\frac{1}{3}} * \mu^{-\frac{1}{6}} * k^{\frac{2}{3}} * \sqrt{\frac{Mass\ Flow}{L * A_{flow}}} * A_{hot} * \Delta T +$$

$$\frac{k * A_{no-flow}}{L_{no-flow}} * \Delta T + \frac{k_{bridge} * A_{bridge}}{L_{bridge}} * \Delta T$$

where k=gas conductivity, $C_p$=specific heat, $\mu$=viscosity, $\rho$=density, and $h_{flow}$=composite property term for Mass Flow. Heat transfer from the microbridge is mass flow dependent, but also has some additional gas property dependence. With no flow, the heat transfer is dependent on the thermal conductivity of the gas and the thermal conductivity of the microbridge structure. These equations are not intended to be precise but rather capture the overall dependencies.

To determine volumetric flow rate, the heat transfer may be restated in terms of volumetric flow using the following equation:

$$\dot{Q} \propto C_P^{\frac{1}{3}} * \mu^{-\frac{1}{6}} * k^{\frac{2}{3}} * \rho^{\frac{1}{2}} * \sqrt{\frac{Volume\ flow}{L * A_{flow}}} * A_{hot} * \Delta T +$$

$$\frac{k*A_{no-flow}}{L_{no-flow}}*\Delta T + \frac{k_{bridge}*A_{bridge}}{L_{bridge}}*\Delta T$$

The bridge output may be controlled by heat transfer coefficients, for either true mass flow output or volume flow output. The heat transfer coefficients may have gas property dependence as well as geometric and flow dependencies. The dominant gas property in the heat transfer properties may be thermal conductivity, both in the mass flow dependent term and the no-flow term. The relationship between average bridge temperature and applied power gives another relationship with gas properties around the bridge. Putting a "tail" resistor on the heated bridge circuit allows for the total bridge current to be measured, and thereby the power.

As an example, when power is fed to the heating element $R_{heater}$, molecules in the fluid will transfer heat from the heating element to the upstream and/or downstream resistors, depending on the direction of the fluid flow. Additionally, heat may be dissipated by the fluid away from the heater into the air around the sensor. Thermal properties of the fluid may be determined by monitoring how the heat is transferred by the fluid.

The measure of how much heat is transferred by the fluid, or the thermal conductivity, may be determined using the second tail resistor $R_{tail-2}$, wherein the difference between the voltage supplied to the heating element $R_{heater}$ ($V_{heater}$) and voltage at the second tail resistor $R_{tail-2}$ ($V_{tail-2}$) indicates the power dissipated by the fluid flowing over the heating element $R_{heater}$. If the circuit is run at a constant voltage, the resistance of the heating element $R_{heater}$ changes rapidly as a function of temperature. Additionally, as the composition of the fluid changes, the power dissipated from the heating element $R_{heater}$ changes, and an approximately thermal conductivity of the fluid may be determined using the second tail resistor $R_{tail-2}$.

In addition to the thermal conductivity, the kinematic viscosity can be used to help compensate the flow sensor output. Typically, the relationship between differential pressure due to flow restriction and flow behavior can be characterized using the pressure as a second order polynomial dependence on the volume flow for close to laminar flow conditions. Under these conditions, the linear dependence on volumetric flow is proportional to the gas viscosity, and the square dependence on volume flow is proportional to the gas density, p, (see Bernoulli's equation $\Delta P = \frac{1}{2}*\rho*velocity^2$), producing the following equation, wherein A1 and A2 are components determined by the size of the flow channel 104 (referring back to FIG. 1).

$$\Delta P_{air} = A_2 * V_{housing}^2 + A_1 * V_{housing}$$

The measured pressure drop (or differential pressure) across the flow channel 104 determined by an independent differential pressure sensor (or more than one pressure sensor 120 and 122) may provide a signal dependent on viscosity and density. Then, the following equations may use the differential pressure $\Delta P_{housing}$ as well as other measured characteristics of the fluid flow to determine the kinematic viscosity of fluid flowing through the sensor. By measuring the differential pressure (e.g., pressure drop, $\Delta P$) across the system, a quadratic equation may be developed for the volumetric flow $V_{housing}$, where:

$$\Delta P_{housing} = \frac{\rho_{gas}}{\rho_{air}} * A_2 * V_{housing}^2 + \frac{\mu_{gas}}{\mu_{air}} * A_1 * V_{housing}$$

$$\Delta P_{housing} * \frac{\rho_{air}}{\rho_{gas}} = A_2 * V_{housing}^2 + \frac{\mu_{gas}*\rho_{air}}{\mu_{air}*\rho_{gas}} * A_1 * V_{housing}$$

$$\Delta P_{housing} * \frac{\rho_{air}}{\rho_{gas}} = A_2 * V_{housing}^2 + \frac{\gamma_{gas}}{\gamma_{air}} * A_1 * V_{housing}$$

Through testing of known gases, the relationship between standard volumetric flow and kinematic viscosity may be represented by the following equation, where $V_{gas}$ represents volumetric flow of the gas, $V_{air}$ represents the volumetric flow of air (which may be determined through testing), $\gamma_{gas}$ represents the kinematic viscosity of the gas, $\gamma_{air}$ represents the kinematic viscosity of air, $k_{air}$ represents the thermal conductivity of air, and $k_{gas}$ represents the thermal conductivity of the gas (as determined above):

$$V_{gas} = V_{air} * \frac{\gamma_{gas}}{\gamma_{air}} * \sqrt[a]{\frac{k_{air}}{k_{gas}}}$$

This relationship may be combined with the above equations to determine the kinematic viscosity of the gas. Since the output of the microbridge indicates the signal for air, the equations can be solved for the kinematic viscosity ratio knowing the density ratio and thermal conductivity ratio.

$$\Delta P_{housing} * \frac{\rho_{air}}{\rho_{gas}} =$$

$$A_2 * \left(V_{air} * \frac{\gamma_{gas}}{\gamma_{air}} * \sqrt[s]{\frac{k_{air}}{k_{gas}}}\right)^2 + \frac{\gamma_{gas}}{\gamma_{air}} * A_1 * \left(V_{air} * \frac{\gamma_{gas}}{\gamma_{air}} * \sqrt[s]{\frac{k_{air}}{k_{gas}}}\right)$$

$$\frac{\gamma_{gas}}{\gamma_{air}} = \sqrt{\frac{\frac{\rho_{air}}{\rho_{gas}} * \Delta P_{housing}}{\left(A_2 * \left(\frac{k_{air}}{k_{gas}}\right)^{\frac{2}{3}} * V_{air}^2 + A_1 * \left(\frac{k_{air}}{k_{gas}}\right)^{\frac{1}{3}} * V_{air}\right)}}$$

The equation assumes the differential pressure calibration for the housing (e.g., the flow channel 104) is known to determine the A2 and A1 terms are known, the thermal conductivity ratio of the gas under test (determined above) is known, and the density ratio (which is associated with thermal conductivity) is known. Thus, The A2 and A1 terms can be determined and stored during calibration prior to use of the sensor to measure flow. The signals used in this equation to determine kinematic viscosity include the differential heat transfer flow signal (microbridge flow output), the thermal dissipation signal (tail resistor voltage), and the differential pressure generated by flow going through flow sensor.

In some embodiments, the circuit 300 may be calibrated using air or another known fluid. As an example, the circuit 300 may be used in a sensor configured to detect natural gas. Natural gas includes mostly methane, but may also contain other gases that can affect the thermal properties of the fluid, and therefore the sensor reading. These affects may be compensated for by also monitoring the thermal properties of the fluid and correcting the sensor reading accordingly. As another example, the circuit 300 may be used in a sensor configured to detect fluid in the medical field. Anesthesia gases may comprise mostly air with trace gases that can affect the thermal properties and therefore the sensor reading. These affects may be compensated for by also monitoring the thermal properties of the fluid, and correcting the sensor reading as described herein.

Figure 4:
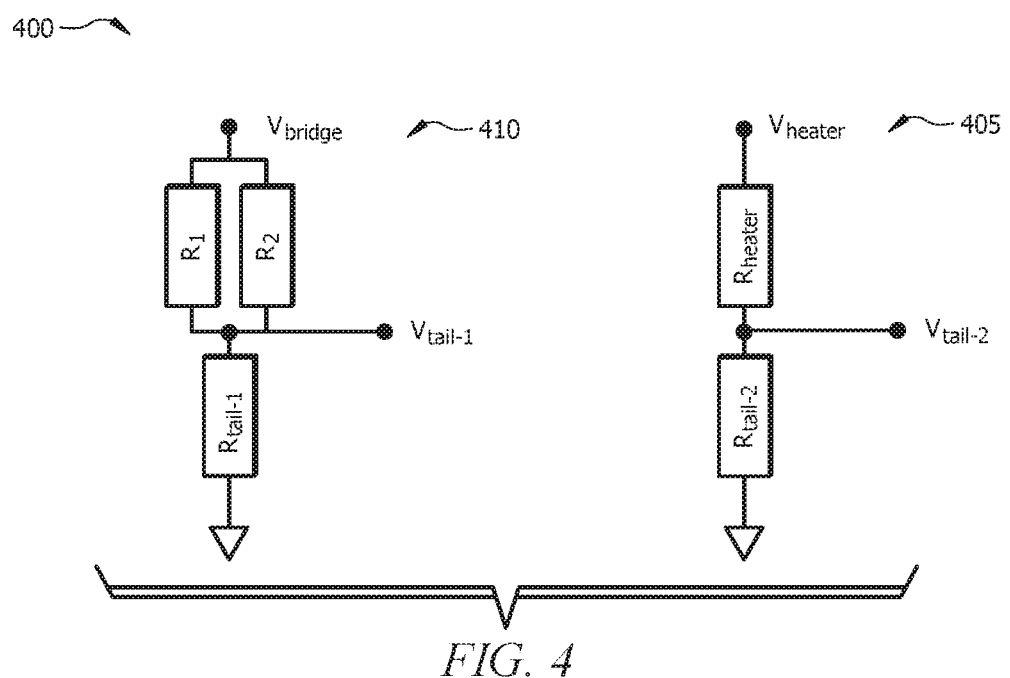
FIG. 4 illustrates a schematic circuit diagram of a sensor configured to determine thermal properties of a fluid.

Referring now to FIG. 4, another embodiment of a circuit 400 is shown, wherein the circuit 400 comprises a bridge circuit 410 and a heater circuit 405. In some embodiments, the circuit 400 may be used concurrently with a flow sensor, wherein the circuit 400 may be configured to determine thermal properties of the fluid, but may not be configured to determine the flow rate of the fluid. The circuit 400 may function similarly to the circuit 300 described above, wherein the circuit 400 may comprise only one upstream resistive $R_1$ element and one downstream resistive element $R_2$.

In some embodiments, when the circuit 400 is used with another sensor for detecting the flow rate, the circuit 400 may be powered less frequently than the flow sensor. For example, while the flow sensor may take readings every 1 second, the circuit 400 (that is configured to determine thermal properties of the fluid) may take readings every 30 seconds. This may reduce the power usage when compared to the circuit 300 described above.

Figure 5:
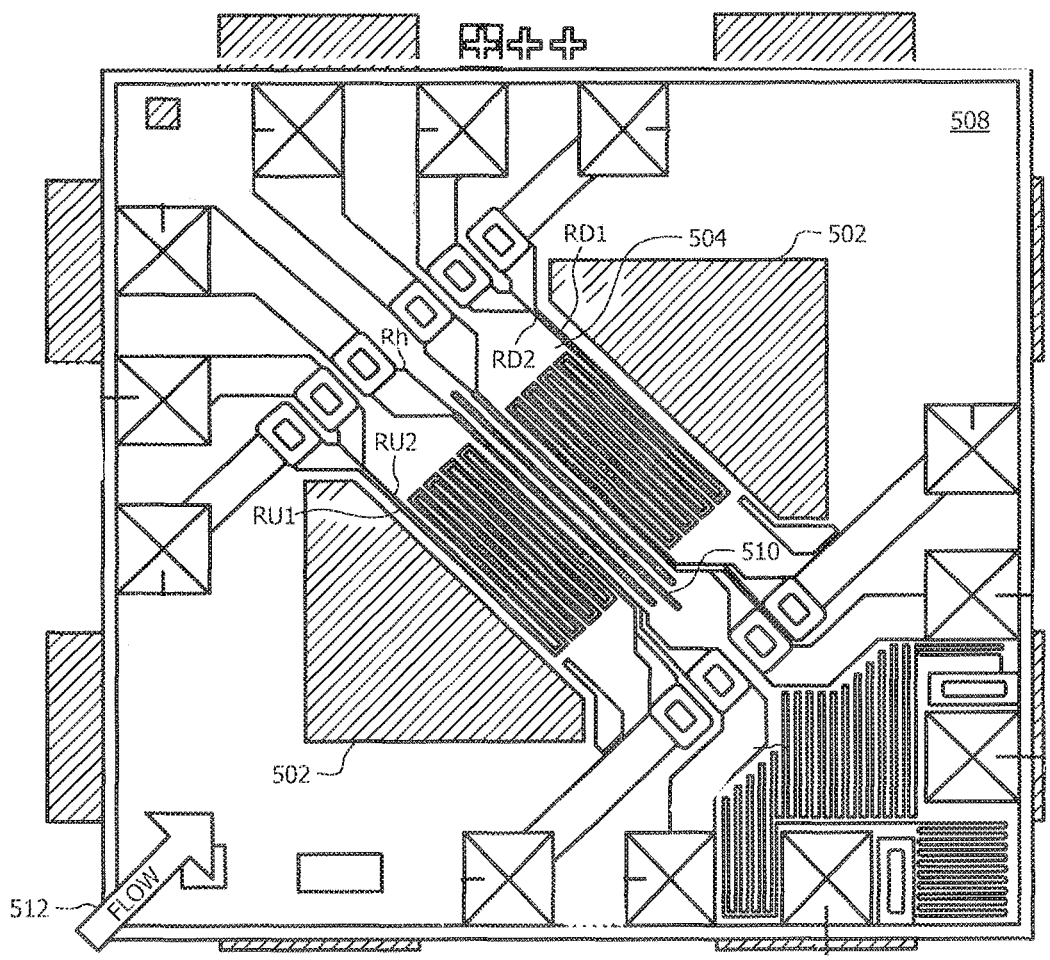
FIG. 5 is a top view of an illustrative flow sensor.

FIG. 5 is a top view of an example flow sensor die 500. The flow sensor die has an etched cavity 502 that extends under a membrane 504. The etched cavity 502 helps to thermally isolate the membrane 504 from the substrate 508 of the flow sensor die 500. The example flow sensor die 500 includes a slit 510 through the membrane 504 that extends transverse across the membrane 504. During use, the flow sensor die 500 is positioned in a flow channel.

To help explain the operation of the flow sensor die 500, it is assumed that fluid flows over the flow sensor die 500 in the direction indicated by arrow 512. When so provided, the two upstream resistive elements RU1 and RU2 are positioned on the membrane 504 upstream of the slit 510, and the two downstream resistive elements RD1 and RD2 are positioned on the membrane 504 downstream of the slit 510. The heater resistor Rh is positioned between the upstream resistive elements RU1 and RU2 and the downstream resistive elements RD1 and RD2. In the example shown, the heater resistor Rh includes two legs connected in series, with one leg positioned on either side of the slit 510. The example flow sensor die 500 is one possible layout of the schematic circuit diagrams shown in FIGS. 2-4. This example flow sensor die 500 is considered a test die, and these connections are intended to be made external to the flow sensor die 500. However, they could be made on the flow sensor die 500 if desired.

Having described various devices and methods herein, exemplary embodiments or aspects can include, but are not limited to:

In a first embodiment, a sensor for sensing a flow rate of a fluid comprises: an upstream resistive element having a first resistance that changes with temperature; a downstream resistive element having a second resistance that changes with temperature, wherein the downstream resistive element is situated downstream of the upstream resistive element in the flow direction of the fluid, wherein the upstream resistive element and the downstream resistive element are operatively connected in a bridge circuit; at least one tail resistor configured to determine thermal conductivity of the fluid, wherein the at least one tail resistor is stable with temperature, and wherein the at least one tail resistor is electrically coupled to at least one of the upstream resistive element or the downstream resistive element; at least one pressure sensor configured to determine a differential pressure in the flow direction of the fluid; and circuitry configured to use the differential pressure with the thermal conductivity to determine a kinematic viscosity of the fluid, and compensate an output of the bridge circuit.

A second embodiment can include the sensor of the first embodiment, further comprising a heating element configured to heat the fluid flowing through a flow channel, wherein the at least one tail resistor is electrically coupled to at least one of the upstream resistive element, the downstream resistive element, or the heating element.

A third embodiment can include the sensor of the second embodiment, wherein the at least one tail resistor is electrically coupled to the heating element, and wherein the circuitry is configured to measure a voltage difference between the heating element and the tail resistor, and determine the thermal conductivity of the fluid using the measured voltage difference between the heating element and the tail resistor.

A fourth embodiment can include the sensor of any of the first to third embodiments, wherein circuitry is configured to determine a fluid flow correction factor using the thermal conductivity of the fluid and the kinematic viscosity of the fluid.

A fifth embodiment can include the sensor of any of the first to fourth embodiments, wherein the at least one pressure sensor comprises an inlet pressure sensor and an outlet pressure sensor.

A sixth embodiment can include the sensor of any of the first to fifth embodiments, wherein the sensor comprises a flow channel.

A seventh embodiment can include the sensor of the sixth embodiment, wherein the pressure sensor is configured to measure the differential pressure between an inlet of the flow channel and an outlet of the flow channel.

In an eighth embodiment, a method for determining fluid flow comprises: supplying power to a bridge circuit in a flow sensor, wherein the bridge circuit comprises an upstream resistive element, a downstream resistive element, and at least one tail resistor electrically coupled to at least one of the upstream resistive element or the downstream resistive element, wherein the flow sensor comprises at least one pressure sensor disposed in a flow channel of the flow sensor; passing the fluid over the bridge circuit via the flow channel; measuring the voltage change at the tail resistor; determining the thermal conductivity of the fluid based on the measured voltage change; determining a differential pressure between an inlet of the flow channel and an outlet of the flow channel; and determining the kinematic viscosity of the fluid using the thermal conductivity and the differential pressure.

A ninth embodiment can include the method of the eighth embodiment, wherein the at least one tail resistor is stable with temperature.

A tenth embodiment can include the method of the eighth or ninth embodiment, wherein the bridge circuit comprises a heating element.

An eleventh embodiment can include the method of the tenth embodiment, wherein the at least one tail resistor is electrically coupled to the heating element, and wherein measuring the voltage change at the tail resistor comprises measuring the voltage difference between the tail resistor and the heating element.

A twelfth embodiment can include the method of any of the eighth to eleventh embodiments, wherein determining the differential pressure comprises comparing a signal from an inlet pressure sensor to a signal from an outlet pressure sensor.

A thirteenth embodiment can include the method of any of the eighth to twelfth embodiments, further comprising restricting the fluid flow through the flow channel near the bridge circuit.

A fourteenth embodiment can include the method of any of the eighth to thirteenth embodiments, further comprising determining a fluid flow rate correction factor using the thermal conductivity and the kinematic viscosity.

A fifteenth embodiment can include the method of any of the eighth to fourteenth embodiments, further comprising: determining a fluid flow rate through a sensor; and adjusting the determined fluid flow rate based on the determined kinematic viscosity of the fluid.

In a sixteenth embodiment, a flow sensor for sensing a fluid flow rate through a flow channel comprises: a heating element configured to be substantially in direct thermal coupling with fluid flowing through the flow channel; an upstream resistive element having a first resistance that changes with temperature; a downstream resistive element having a second resistance that changes with temperature, wherein the downstream resistive element is situated downstream of the upstream resistive element in the flow channel; at least one tail resistor configured to indicate thermal conductivity of the fluid flowing through the flow channel; and a pressure sensor configured to determine a differential pressure in the flow direction of the fluid flowing through the flow channel, wherein: the differential pressure is used with the thermal conductivity to determine a kinematic viscosity of the fluid flowing through the flow channel; the upstream resistive element and the downstream resistive element are operatively connected in a bridge circuit; the at least one tail resistor is stable with temperature; and the at least one tail resistor is electrically coupled to at least one of the upstream resistive element, the downstream resistive element, or the heating element.

A seventh embodiment can include the sensor of the sixteenth embodiment, wherein the at least one tail resistor is electrically coupled to the heating element, and the measured voltage difference between the heating element and the tail resistor indicates the power dissipated by the fluid flowing over the heating element, and therefore the thermal conductivity of the fluid.

An eighteenth embodiment can include the sensor of the sixteenth or seventeenth embodiment, wherein the thermal conductivity of the fluid and the kinematic viscosity of the fluid are used to determine a fluid flow rate correction factor.

A nineteenth embodiment can include the sensor of any of the sixteenth to eighteenth embodiments, wherein the flow channel restricts the fluid flow through the flow channel near the bridge circuit.

A twentieth embodiment can include the sensor of any of the sixteenth to nineteenth embodiments, wherein the pressure sensor comprises an inlet pressure sensor and an outlet pressure sensor.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present invention(s). Furthermore, any advantages and features described above may relate to specific embodiments, but shall not limit the application of such issued claims to processes and structures accomplishing any or all of the above advantages or having any or all of the above features.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure. Specifically and by way of example, although the headings might refer to a "Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Use of broader terms such as "comprises," "includes," and "having" should be understood to provide support for narrower terms such as "consisting of," "consisting essentially of," and "comprised substantially of." Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A sensor for sensing a flow rate of a fluid, the sensor comprising:
an upstream resistive element having a first resistance that changes with temperature;
a downstream resistive element having a second resistance that changes with temperature, wherein the downstream resistive element is situated downstream of the upstream resistive element in the flow direction of the fluid, wherein the upstream resistive element and the downstream resistive element are operatively connected in a bridge circuit;
at least one tail resistor configured to determine a thermal conductivity of the fluid, wherein the at least one tail resistor is stable with temperature, and wherein the at least one tail resistor is electrically coupled to at least one of the upstream resistive element or the downstream resistive element;
at least one pressure sensor configured to determine a differential pressure in the flow direction of the fluid; and
circuitry configured to use the differential pressure with the thermal conductivity to determine a kinematic viscosity of the fluid, and compensate an output of the bridge circuit.

2. The sensor of claim 1, further comprising a heating element configured to heat the fluid flowing through a flow channel, wherein the at least one tail resistor is electrically coupled to at least one of the upstream resistive element, the downstream resistive element, or the heating element.

3. The sensor of claim 2, wherein the at least one tail resistor is electrically coupled to the heating element, and wherein the circuitry is configured to measure a voltage difference between the heating element and the tail resistor, and determine the thermal conductivity of the fluid using the measured voltage difference between the heating element and the tail resistor.

4. The sensor of claim 1, wherein circuitry is configured to determine a fluid flow correction factor using the thermal conductivity of the fluid and the kinematic viscosity of the fluid.

5. The sensor of claim 1, wherein the at least one pressure sensor comprises an inlet pressure sensor and an outlet pressure sensor.

6. The sensor of claim 1, wherein the sensor comprises a flow channel.

7. The sensor of claim 6, wherein the pressure sensor is configured to measure the differential pressure between an inlet of the flow channel and an outlet of the flow channel.

8. A method for determining fluid flow, the method comprising:
supplying power to a bridge circuit in a flow sensor, wherein the bridge circuit comprises an upstream resistive element, a downstream resistive element, and at least one tail resistor electrically coupled to at least one of the upstream resistive element or the downstream resistive element, wherein the flow sensor comprises at least one pressure sensor disposed in a flow channel of the flow sensor;
passing the fluid over the bridge circuit via the flow channel;
measuring the voltage change at the tail resistor;
determining a thermal conductivity of the fluid based on the measured voltage change;
determining a differential pressure between an inlet of the flow channel and an outlet of the flow channel; and
determining a kinematic viscosity of the fluid using the thermal conductivity and the differential pressure.

9. The method of claim 8, wherein the at least one tail resistor is stable with temperature.

10. The method of claim 8, wherein the bridge circuit comprises a heating element.

11. The method of claim 10, wherein the at least one tail resistor is electrically coupled to the heating element, and wherein measuring the voltage change at the tail resistor comprises measuring the voltage difference between the tail resistor and the heating element.

12. The method of claim 8, wherein determining the differential pressure comprises comparing a signal from an inlet pressure sensor to a signal from an outlet pressure sensor.

13. The method of claim 8, further comprising restricting the fluid flow through the flow channel near the bridge circuit.

14. The method of claim 8, further comprising determining a fluid flow rate correction factor using the thermal conductivity and the kinematic viscosity.

15. The method of claim 8, further comprising:
determining a fluid flow rate through a sensor; and
adjusting the determined fluid flow rate based on the determined kinematic viscosity of the fluid.

16. A flow sensor for sensing a fluid flow rate through a flow channel, the flow sensor comprising:
a heating element configured to be substantially in direct thermal coupling with fluid flowing through the flow channel;
an upstream resistive element having a first resistance that changes with temperature;
a downstream resistive element having a second resistance that changes with temperature, wherein the downstream resistive element is situated downstream of the upstream resistive element in the flow channel;
at least one tail resistor configured to indicate a thermal conductivity of the fluid flowing through the flow channel; and
a pressure sensor configured to determine a differential pressure in the flow direction of the fluid flowing through the flow channel,
wherein:
the differential pressure is used with the thermal conductivity to determine a kinematic viscosity of the fluid flowing through the flow channel;
the upstream resistive element and the downstream resistive element are operatively connected in a bridge circuit;
the at least one tail resistor is stable with temperature; and
the at least one tail resistor is electrically coupled to at least one of the upstream resistive element, the downstream resistive element, or the heating element.

17. The flow sensor of claim 16, wherein the at least one tail resistor is electrically coupled to the heating element, and the measured voltage difference between the heating element and the tail resistor indicates the power dissipated by the fluid flowing over the heating element, and therefore the thermal conductivity of the fluid.

18. The sensor of claim 16, wherein the thermal conductivity of the fluid and the kinematic viscosity of the fluid are used to determine a fluid flow rate correction factor.

19. The sensor of claim 16, wherein the flow channel restricts the fluid flow through the flow channel near the bridge circuit.

20. The sensor of claim 16, wherein the pressure sensor comprises an inlet pressure sensor and an outlet pressure sensor.

\* \* \* \* \*